United States Patent [19]

Medina

[11] 4,190,884
[45] Feb. 26, 1980

[54] AUTOMATIC DIGITAL WATER CONTROL SYSTEM

[76] Inventor: Alvaro Medina, 714 Lincoln Pl., Boulder, Colo. 80302

[21] Appl. No.: 937,237

[22] Filed: Aug. 28, 1978

[51] Int. Cl.$^2$ .................... G05B 1/08; G05B 11/18; G06F 3/05
[52] U.S. Cl. .................... 364/104; 239/63; 364/569
[58] Field of Search .................... 364/104, 510, , 569; 239/63, 69, 70, DIG. 15; 58/33

[56] References Cited

U.S. PATENT DOCUMENTS

| | | | |
|---|---|---|---|
| 3,063,643 | 11/1962 | Roberts | 239/DIG. 15 |
| 3,599,867 | 8/1971 | Griswold et al. | 239/63 |
| 3,723,753 | 3/1973 | Davis | 307/41 |
| 3,787,728 | 1/1974 | Bayer et al. | 307/41 |
| 3,869,854 | 3/1975 | Church | 58/33 |
| 3,951,339 | 4/1976 | Dufresne | 239/70 X |
| 3,969,703 | 7/1976 | Kwiatkowski et al. | 364/104 X |
| 3,975,622 | 8/1976 | Horn et al. | 364/104 |
| 3,991,939 | 11/1976 | Maclay | 239/63 |
| 4,004,612 | 1/1977 | Hummel, Jr. et al. | 137/624.11 |
| 4,012,673 | 3/1977 | Saarem et al. | 361/196 |
| 4,016,640 | 4/1977 | Mesecar | 235/92 CT |
| 4,025,902 | 5/1977 | Nakao et al. | 364/104 X |
| 4,029,950 | 6/1977 | Haga | 364/104 |
| 4,068,155 | 1/1978 | Robbins et al. | 364/104 X |
| 4,129,901 | 12/1978 | Masuda | 364/104 |

Primary Examiner—Edward J. Wise
Attorney, Agent, or Firm—O'Rourke & Harris

[57] ABSTRACT

An automatic digital system is disclosed for controlling the duration and frequency of application of water to a lawn or the like. The system includes a keyboard to facilitate programming and/or reprogramming of both the duration and frequency of watering and one or more sets of memory circuits are included in the system to store various programs to be utilized. A digital clock controls operation of time control and generating circuitry to provide outputs to comparators along with outputs from the memory circuits to effect the desired control of solenoids establishing the duration and frequency of watering. Each set of memory circuits includes a plurality of watering stations each of which can be individually and sequentially actuated by the control system and each of which stations can have a plurality of sprinkler heads. By use of a plurality of sets of memory circuits, different watering programs can be carried out at different times as, for example, on different days of the week, and, by use of repeater circuitry, the particular watering program can be repeated as, for example, to occur several times during each day, or caused to occur only at selected intervals as, for example, every second day or the like. An LED display is also provided at the keyboard to facilitate programming and control of watering.

27 Claims, 14 Drawing Figures

AUTOMATIC DIGITAL WATER CONTROL SYSTEM

FIELD OF THE INVENTION

This invention relates to an automatic digital control system and, more particularly, relates to a system for controlling the duration and frequency of application of water to a lawn or the like.

BACKGROUND OF THE INVENTION

Systems for controlling specific operations are well known, and these include, for example, systems for controlling watering, or irrigating, a lawn or the like. A universal modular controller is shown, for example, in U.S. Pat. No. 4,016,407, and irrigation control systems are shown, for example, in U.S. Pat. Nos. 3,951,339 and 4,004,612.

In addition, digital control systems for controlling watering of a lawn have heretofore been suggested (see, for example, U.S. Pat. No. 3,869,854), as have solid state systems utilizing integrated circuits and using digital clocks for establishing the watering program (see, for example, U.S. Pat. Nos. 3,869,854 and 4,012,673).

Also, it has been heretofore suggested that control systems for controlling watering of lawns and the like include means for precluding sprinkling in case of rain (see, for example, U.S. Pat. No. 3,787,728) and/or utilize a computer having a control panel for programming and control (see, for example, U.S. Pat. No. 3,723,753).

It has also been heretofore suggested that a control system for controlling watering of lawns or the like include refinements such as means for establishing separate timing for each station, different programs for different days, and/or repeatable programs (see, for example, U.S. Pat. Nos. 3,869,854 and 4,012,673).

It can therefore be appreciated that the prior art teaches many systems for controlling watering of a lawn or the like, with such systems including digital circuitry and featuring a variety of means for establishing and changing programs, as well as precluding or altering such programs upon the ocurrence of a predetermined event or events.

It is believed, however, that an improved control system for controlling watering of a lawn or the like is still possible and is needed, particularly with respect to components utilized and/or particular results achieved.

SUMMARY OF THE INVENTION

This invention provides an improved, digital control system that is particularly useful for automatic control of lawn watering and the like. The system of this invention utilizes a keyboard to facilitate programming and reprogramming as well as memory circuits for storing the program and comparators for receiving the memory circuit outputs along with time control and generating signals controlled by the output of a digital clock to effect the desired duration and frequency of watering.

It is therefore an object of this invention to provide an improved digital control system.

It is another object of this invention to provide an improved control system for automatically controlling watering of a lawn or the like.

It is another object of this invention to provide an improved automatic digital control system for controlling watering of a lawn or the like.

It is still another object of this invention to provide an improved control system for automatically controlling watering with the system having memory circuits for storing watering programs.

It is yet another object of this invention to provide an improved control system for automatic control of watering having memory circuits programmed by keyboard positioned switches and having comparators receiving memory circuit outputs and outputs from digital clock control circuitry to effect the duration and frequency control of watering.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
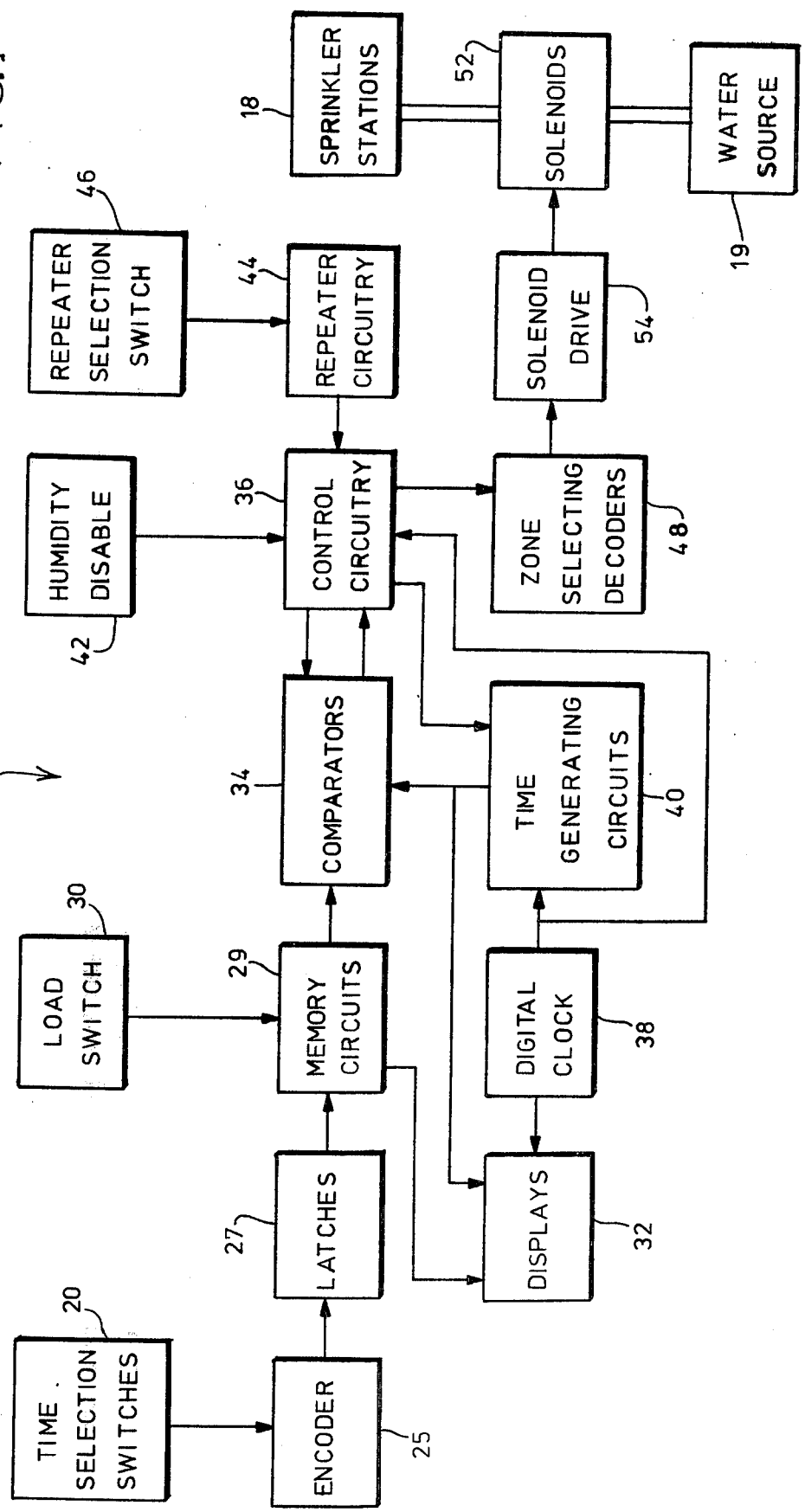
FIG. 1 is a block diagram of the system of this invention.
Figure 2:
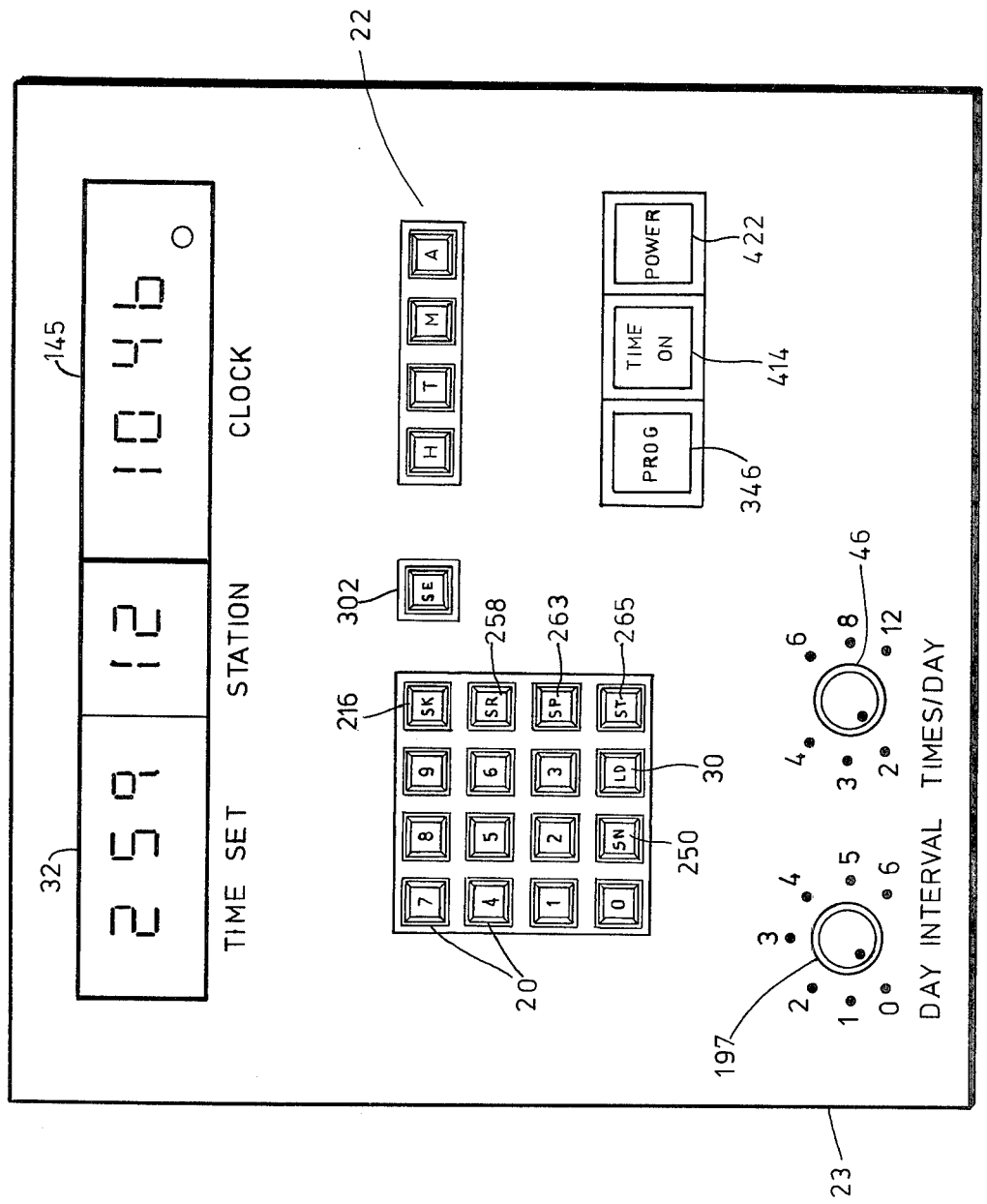
FIG. 2 is a front view of the front panel of the keyboard utilized in this invention.

Referring now to the drawings, a digital solid state control system 17 of this invention is shown by the electronic block diagram of FIG. 1 to control sprinkling of lawns at sprinkler stations 18 connectable with a conventional water source 19. Time selection switches 20, as indicated in FIG. 1, are preferably located at the front panel 22 of keyboard 23 (as shown in FIG. 2) to enable encoding of encoder 25.

As shown in FIG. 1, the output from encoder 25 is coupled through latches 27 to memory circuits 29, which circuits are connected with load switch 30 and provide outputs to displays 32 at the keyboard and to comparators 34. Comparators 34 provide outputs to and receive inputs from time control circuitry 36, as indicated in FIG. 1 and as brought out more fully hereinafter.

Digital clock 38 provides outputs to time generating circuits 40 and to time control circuitry 36, while time generating circuits 40 provide outputs to comparators 34 and displays 32 and receives an input from time control circuitry 36. Time control circuitry 36 may also be connected with a conventional humidity disable circuit 42 (to preclude sprinkling in conventional fashion when the humidity is such so as to make sprinkling unnecessary) and repeater circuitry 44, the latter of which is connected with repeater selection switch 46.

The output from time control circuitry 36 is coupled to zone selection decoding circuitry 48, the output from which is utilized to energize solenoids 52 through solenoid drive 54.

Figure 3:
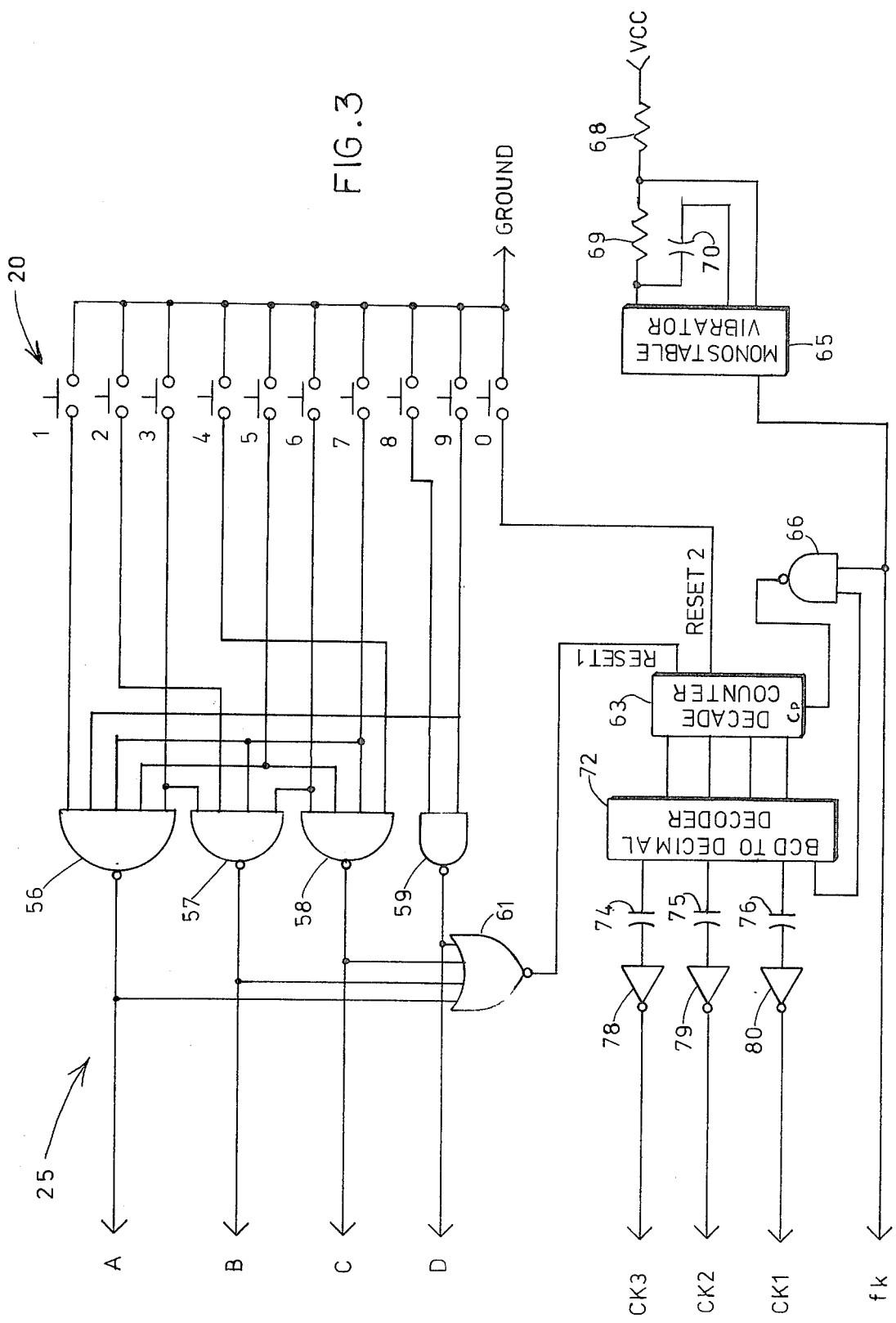
FIG. 3 is a block and schematic diagram of the encoder circuitry utilized in this invention.

As shown in FIGS. 2 and 3, time selection switches 20 preferably include 10 individual switches (numbered 0 through 9). As shown in FIG. 3, one side of each switch 20 is connected to electrical ground, while the other side of switches 1 through 9 are connected with NAND gates 56, 57, 58 and 59 of encoder 25.

A binary coded decimal (BCD) output is obtained at the outputs of the four NAND gates 56, 57, 58 and 59 when any of the nine individual momentary switches 1 through 9 are closed (such as being depressed), with the output being as follows:

| SWITCH | TERMINAL OUTPUTS (BCD) | | | | DECIMAL |
|---|---|---|---|---|---|
| | D | C | B | A | |
| 1 | 0 | 0 | 0 | 1 | 1 |
| 2 | 0 | 0 | 1 | 0 | 2 |
| 3 | 0 | 0 | 1 | 1 | 3 |
| 4 | 0 | 1 | 1 | 1 | 4 |
| 5 | 0 | 1 | 0 | 1 | 5 |
| 6 | 0 | 1 | 1 | 0 | 6 |
| 7 | 0 | 1 | 1 | 1 | 7 |
| 8 | 1 | 0 | 0 | 0 | 8 |
| 9 | 1 | 0 | 0 | 1 | 9 |

Each time that an individual switch 1 through 9 (of switches 20) is depressed, an output is coupled through NOR gate 61 in the form of a low pulse which enables decade ($\div 10$) counter 63 to count at a frequency determined by monostable multivibrator 65 since multivibrator 63 provides an output to decade counter 63 through NAND gate 66.

Monostable multivibrator 65 is used as the frequency source for counter 63 which the desired frequency $f_k$ being determined by selection of resistors 68 and 69 and capacitor 70 ($f_k$ must be between 30 Hz and 90 Hz for proper debouncing and operation of keyboard inputs).

As shown in FIG. 3, the ungrounded side of the individual switch marked 0 (of switches 20) is also connected with decade counter 63 to provide a reset input.

Figure 4:
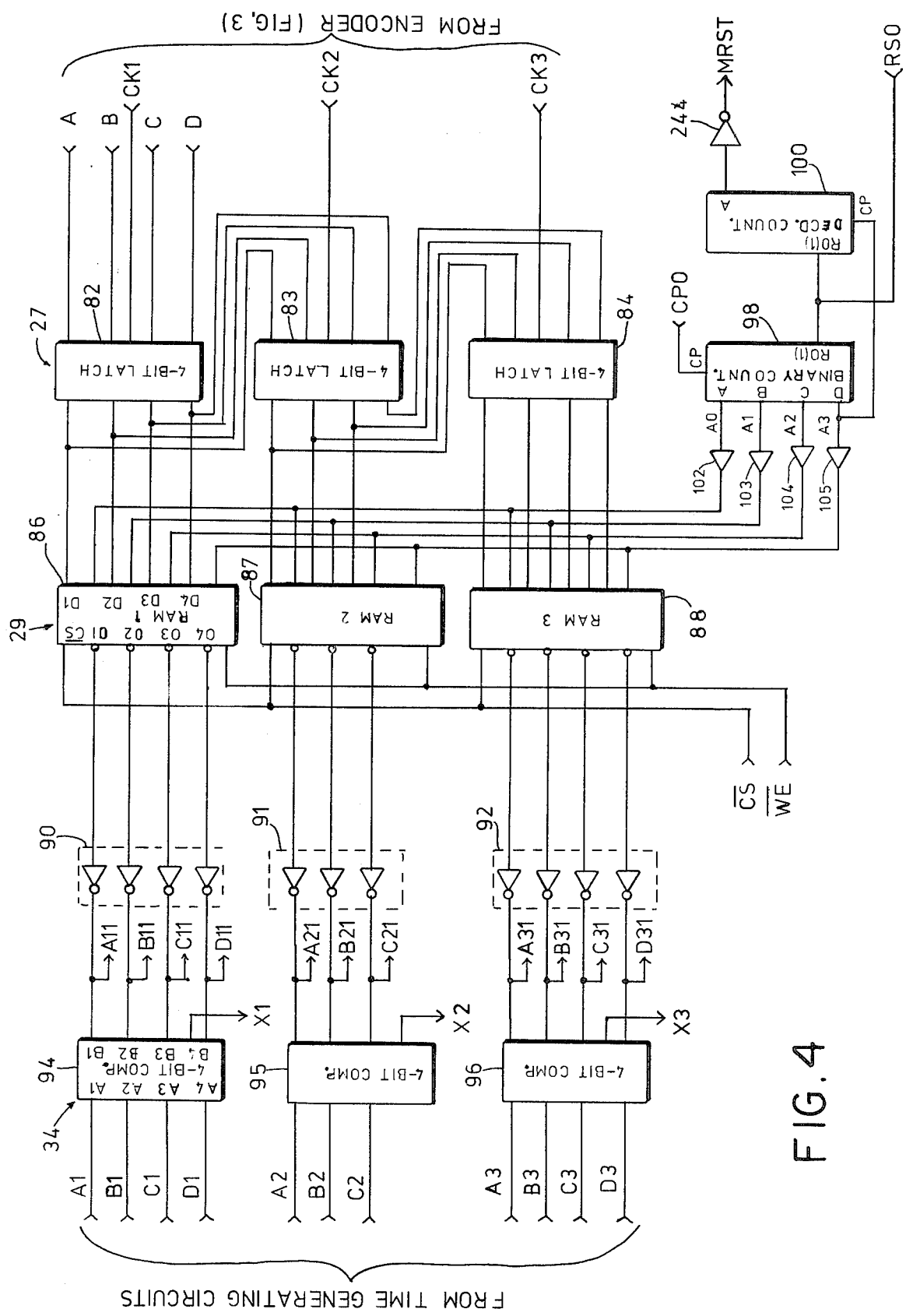
FIG. 4 is a block and schematic diagram of the memory and demultiplexer circuitry utilized in this invention.

The outputs of decade counter 63 are connected to the inputs of BCD-to-decimal decoder 72. When decade counter 63 starts to count, decoder 72 provides a sequence of low pulses at its outputs. These pulses are shortened by capacitors 74, 75 and 76 with the output signal being then coupled through inverters 78, 79 and 80, the outputs of which are high level short pulses which are coupled to three 4-bit latches 82, 83 and 84 of latches 27 (as shown in FIG. 4) to activate the clocks therein. BCD-to-decimal decoder 72 also provides an output to NAND gate 66.

As shown in FIG. 4, 4-bit latch 82 receives the outputs (marked A,B,C and D) from NAND gates 56–59.

The three 4-bit latches 82, 83, and 84 may be TTL 7475 type latch circuits the outputs of which follow the information applied to the inputs when the clock input is in the logical state 1. As shown, the outputs of latch 82 are connected to the inputs of latch 83 and at the same time to the inputs of memory circuits 29 and, more particularly, to the inputs of integrated circuit 86 which is a 64 bit random access memory (16 bytes of 4 bits each). Similarly, the outputs of latch 83 are connected to the inputs of latch 84 and to the inputs of integrated circuit 87 which, like integrated circuit 86, is a 64 bit random access memory.

The outputs of latch 84 are similarly connected to the inputs of integrated circuit 88, which, like integrated circuits 86 and 87, is also a 64 bit random access memory. These random access memories (RAMS) have open collector complemented outputs and must be inverted by integrated circuits 90, 91 and 92 (each of which includes a plurality of inverters as indicated) prior to being coupled to comparators 34, and, more particularly, to 4 bit comparators 94, 95 and 96 (which are preferably DM 8200s).

Comparators 94, 95 and 96 receive a second input from time generating circuit 40 and compare the numerical values of two 4-bit binary numbers by comparing the binary values stored in the memories with the values coupled from the time generating circuit (as detailed hereinafter) and indicates when these values are equal by means of outputs $X_1$, $X_2$ and $X_3$.

For loading the memories, when any of the switches 1 through 9 of switches 20 (see FIG. 3) is depressed, high pulses are generated in sequence and coupled first through CK3, then through CK2, and last through CK1, to latches 84, 83 and 82 in that order. Whatever information is then at the output of latch 83 is shifted to the output of latch 84 by a high pulse at CK3; similarly, information then at the output of latch 82 is shifted to the output of latch 83 by a high pulse at CK2; and any information at the output of AND gates 56–59 (FIG. 3) is transferred to the output of latch 82 by a high pulse at CK1.

In this way, three BCD digits from the keyboard switches can be permanently stored. Preferably, minutes are stored in circuit 82, tens of minutes are stored in circuit 83, and hours are stored in circuit 84. Once the chosen time is stored in latches 82–84, the information is transferred to a predetermined memory location in one of the RAMS (preferably RAM 86 for minutes, RAM 87 for tens of minutes, and RAM 88 for hours).

To carry out this operation, first the set of RAMS desired is selected by providing a low level at the corresponding $\overline{CS}$ input (this is only necessary where a plurality of sets of RAMS are needed as in the case, for example, where 7 sets of 3 RAMS each, corresponding to the seven days of the week, are utilized to allow a different program for each day of the week—in FIG. 4, however, only one set of RAMS has been shown for simplicity—every set of RAMS allows programming of a plurality of different stations, or zones, sixteen, for example, each with its own watering time and predetermined number of sprinkler heads). Next, a proper zone is selected by applying a 4-bit binary number to the four address $A_0$, $A_1$, $A_2$ and $A_3$ which, as shown in FIG. 4, are coupled from binary counter 98 (connected with decade counter 100) through buffer amplifiers 102, 103, 104 and 105, respectively.

Figure 6:
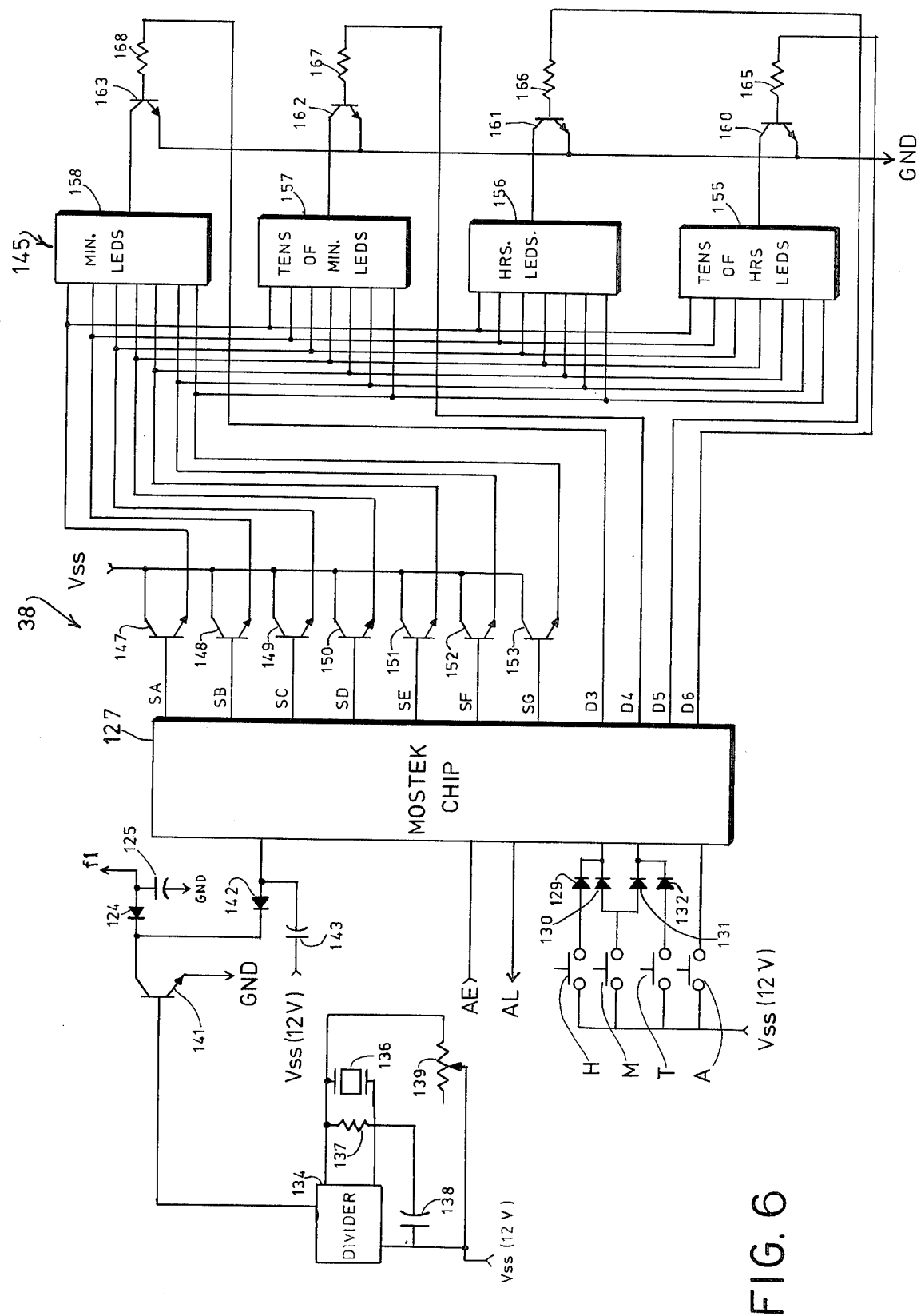
FIG. 6 is a block and schematic diagram of clock circuitry utilized in this invention.

After addressing, information may be either written into or read from the memories. To write, $\overline{CS}$ and $\overline{WE}$ must be at a low level. Information supplied to the four inputs will then be written into the address location. To read, only $\overline{CS}$ need be at a low level. Binary counter 98 is preferably an integrated circuit used to select the address and it counts when $RS_0$ is at a low level and pulses are present at $C_{po}$. Signals at $\overline{WE}$, $C_{po}$ and $RS_0$ are provided by timing control circuitry as shown in FIG. 6.

Figure 5:
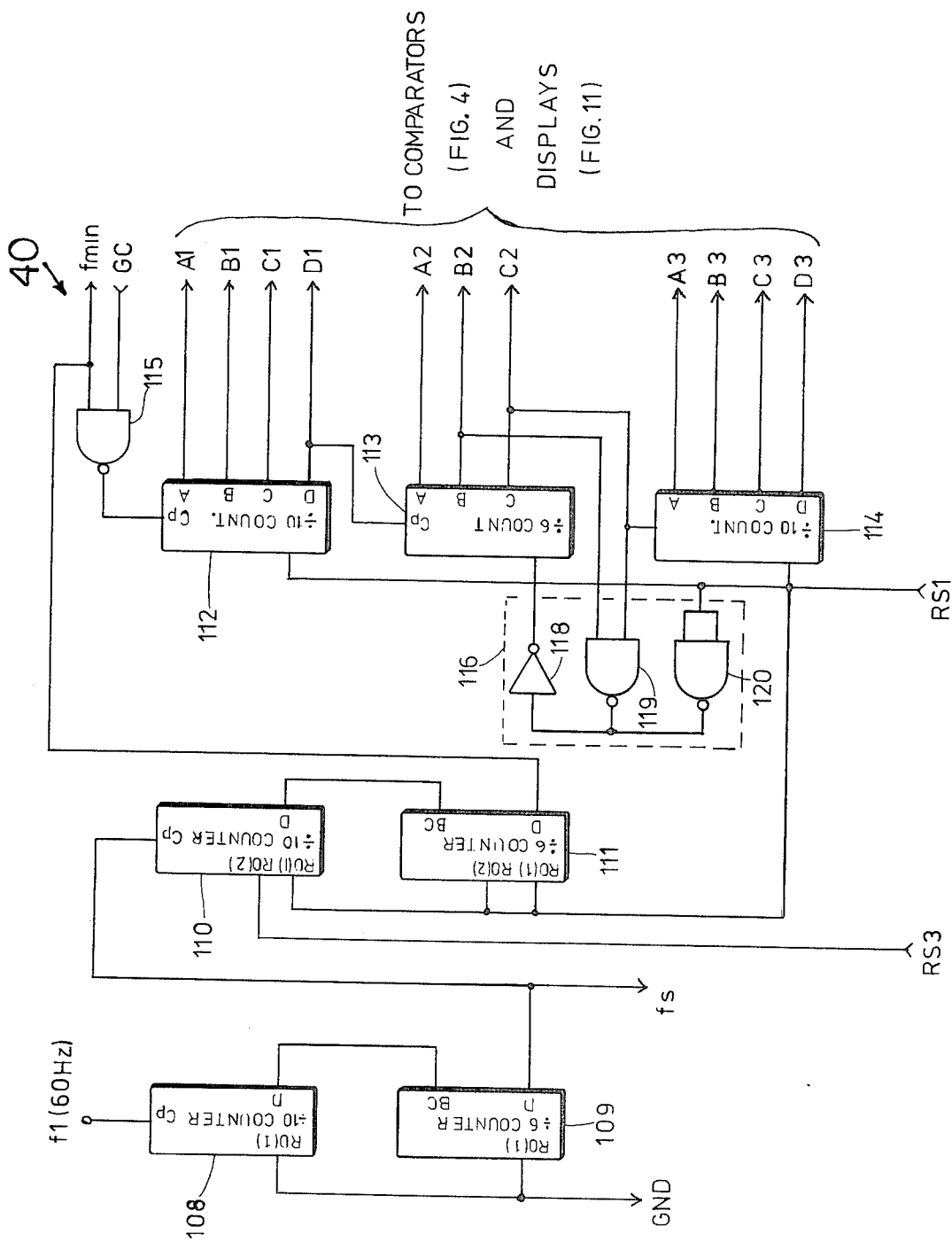
FIG. 5 is a block and schematic diagram of time generating circuitry utilized in this invention.

Time generating circuits 40 are shown in FIG. 5 to include counters 108–114 arranged in a manner so as to provide frequency division by 60, 3600, and 196,000, from an input frequency of 60 Hz, with counters 108, 110, 112, and 114 being decade counters and counters 109, 111 and 113 being ÷6 counters.

Counters 108 and 109 are preferably integrated circuits that are standard TTL 7490 and 7492, respectively, and divide the incoming signal $F_1$ (at 60 Hz) to a signal $F_s$ (at 1 Hz). Counters 110 and 111 are also integrated circuits (TTL 7490 and 7492, respectively) that start counting when there is a low level of reset inputs $RS_1$ and $RS_3$ and divide $f_s$ by 60 providing f min (1 pulse per minute), which output is coupled through NAND gate 115 to counter 112. Counters 112, 113 and 114 are also integrated circuits (TTL 7490).

Counter 113 is reset every six pulses by gate array 116 (that includes inverter 118 and NAND gates 119 and 120) and also by $RS_1$ through the same array. Counters 112, 113 and 114 start counting when there is a low level at $RS_1$ to provide minutes, tens of minutes, and hours, respectively, though each zone, with the counter being reset each time they indicate a length of time equal to $T_0$, the time indicated by the memories for that zone.

The binary output to counters 112, 113 and 114 are coupled as second inputs to comparators 94, 95 and 96, respectively (as shown in FIG. 4). Digital Integrated Circuits Manual, pages 1–143, by National Semiconductors, may be referred to as a reference for operation of comparators 94, 95 and 96 (which are DM 8200s).

The $f_1$ input at a frequency of 60 Hz is coupled to counter 108 of time generating circuitry 40 from the time base of digital clock 38 and, more particularly, from the junction of diode 124 and capacitor 125, as shown in FIG. 6. Digital clock 40 includes a MOSTEK chip 127 (50252). The output AL from pin 17 of chip 127 provides a signal to start the system automatically. Switches H(hours), M (minutes), T (tens of minutes), and A (alarm for starting each timing cycle) are connected to MOSTEK chip 127 with the H,M and T switches being connected to the chip at two inputs 13 and 14 through diodes 129, 130, 131 and 132.

Programmable oscillator divider circuit 134 (MM5369) provides the base frequency $f_1$ (60 Hz) to drive the time counters and also the speed of the 60 Hz input of the clock. Circuit 134 has a crystal 136 connected in parallel with resistor 137 across pins 5 and 6 of programmable oscillator divider circuit 134, while pins 6 and 8 of circuit 134 have a capacitor 138 connected therebetween, and pins 5 and 8 have potentiometer 139 connected therebetween. Pin 1 of circuit 134 is connected with the base of transistor 141, the collector of which is connected to diodes 124 and 142. Diode 142 is connected to pin 22 of MOSTEK chip 127 and a $V_{ss}$ output is provided through capacitor 143.

Indicator 145 of display 32 is connected with chip 127 through transistors 147–153 to provide a display in tens of hours (LEDS 155), hours (LEDS 156), tens of minutes (LED 157), and minutes (LEDS 158) with the common cathode of the LEDS being connected to the collectors of transistors 160, 161, 162, and 163, the base of said transistors being connected to chip 127 through resistors 165, 166, 167 and 168, respectively.

Figure 7A:
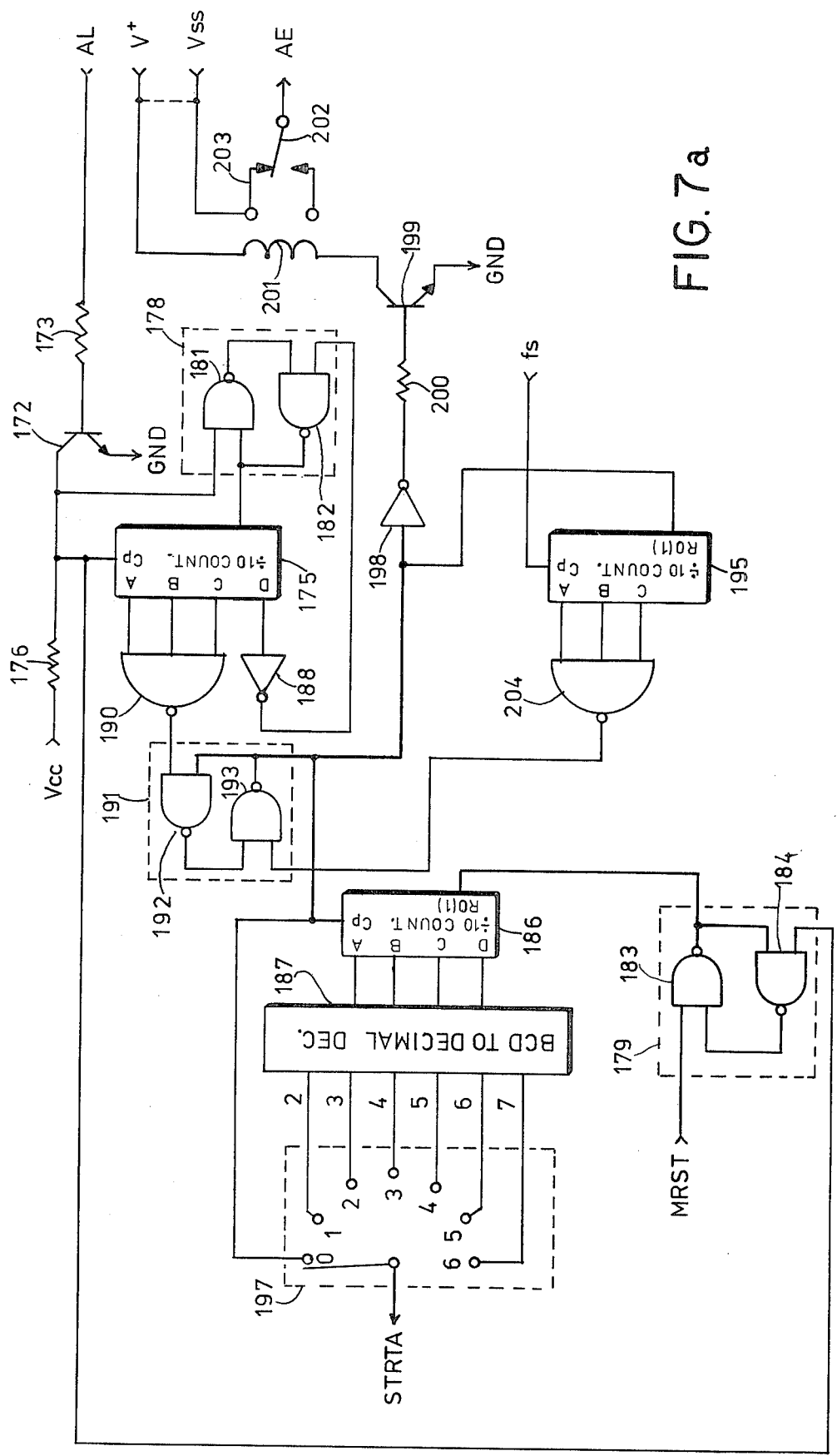
FIGS. 7a and 7b form a block and schematic diagram of time control circuitry utilized in this invention.
Figure 7B:
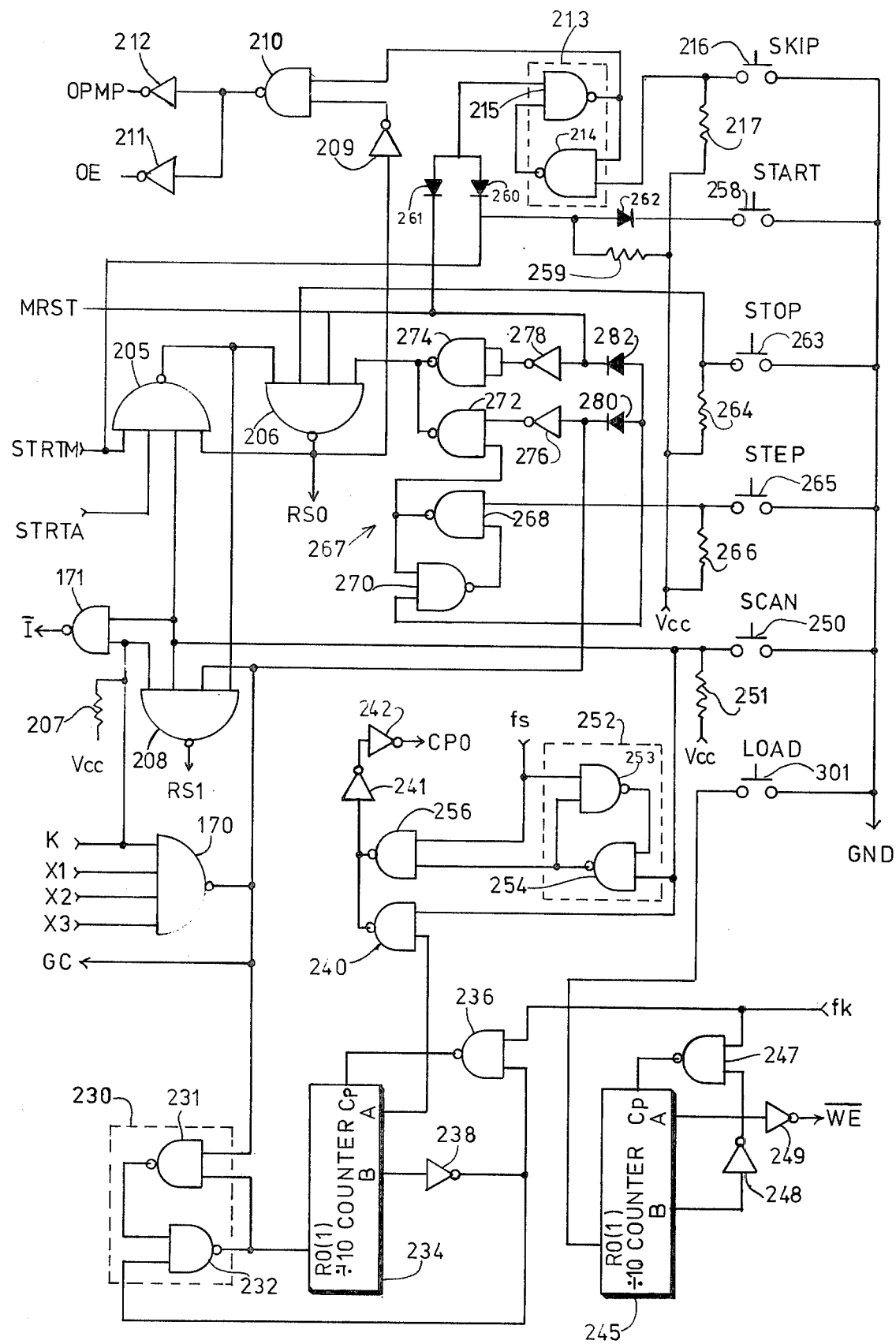

The outputs from comparators 94, 95, and 96 ($X_1$, $X_2$ and $X_3$, respectively) are connected as three inputs to four input NAND gate 170 of timing control circuitry 36, as shown in FIG. 7b. The fourth input is marked K which is also coupled to NAND gate 171 which provides an $\overline{I}$ output. Timing control circuitry 36 generates control signals to activate all other sections of the control system.

When the alarm output of digital clock 38 (FIG. 6) is activated to signal initiation of watering, a train of pulses appears at terminal AL, which are coupled to the base of NPN transistor 172 (FIG. 7a) through transistor 173. The emitter of transistor 172 is grounded and the collector is connected to the $C_p$ input of counter 175 (which input is also connected to receive a 5 volt input ($V_{cc}$) through resistor 176) and to flip-flops 178 and 179 formed by NAND gates 181–182 and 183–184, respectively.

The incoming AL pulses are CMOS level (+12 volt) and transistor 172 converts them to TTL level (+5 volts) in order to be used by counter 175 and flip-flops 178 and 179. The first pulse in the train sets flip-flops 178 and 179 enabling decade counters 175 and 186, the latter of which has BCD-to-decimal decoder 187 connected therewith. The first counter 175 resets flip-flop 178 at the count of eight through inverter 188, and flip-flop 178, in turn, resets counter 175 which remains reset until a new train of pulses comes from the digital clock.

At the count of seven (D=0, C=1, B=1, and A=1) at counter 175, NAND gate 190 sets flip-flop 191, which includes NAND gates 192 and 193, which, in turn, enables decade counter 195 to provide a transition from high level to low level at the $C_p$ input of counter 186, and this causes application of a low level signal to the terminal 0 of day interval switch 197 and at the input of inverter 198 which enables conduction between the collector and grounded emitter of transistor 199 through resistor 200 to energize relay 201 to open the contacts 202–203 and avoid application of voltage V+($V_{ss}$) at terminal AE.

Since $f_s$ occurs at the rate of one pulse per second, at the end of 7 seconds (i.e., at a count of seven in counter 195), a low level signal appears at the output of NAND gate 204 resetting flip-flop 191, which flip-flop resets counter 195, and applies a high level signal at the $C_p$ input of counter 186, terminal 1 of switch 197, and the input of inverter 198 to turn off transistor 199 and deenergize relay 201 to restore the $V_{ss}$ level at terminal AE. The train of pulses at terminal AL occurs once each day as controlled by digital clock 38 (FIG. 6). Consequently, the events just described take place one a day.

When a low level from flip-flop 191 is coupled to the $C_p$ input of counter 186 and contact 0 of switch 197, if the rotatable wiper ($W_p$) of switch 197 is then in position 0 as shown in FIG. 7, the low level is transmitted to input 12 of NAND gate 205. Normally all inputs of NAND gate 205 are in the high state, i.e., logic state 1, and the flip-flop that is formed by NAND gates 205 and 206 is set to provide a low level at $RS_0$ often enabling counters 98 and 100 (FIG. 4).

At the same time, input 13 of NAND gate 208 becomes high (logic state 1) since normally all remaining inputs of NAND gate 208 are high (pin 10 is connected to Vcc through resistor 207), then $RS_1$ goes low enabling counters 110, 111, 112, 113 and 114 (FIG. 5). Simultaneously, a low level at $RS_0$ will cause a high level at OE and OPMP (FIG. 7) through inverter 209 and NAND gate 210, inverter 211 (for output OE) and inverter 212 (for output OPMP) only if the input 2 of gate 211 is at the high state (logic one), or if flip-flop 213 (which includes NAND gates 214 and 215) has not been set by depressing switch 216 (resistor 217 is connected between $V_{cc}$ and the junction of skip switch 216 and gate 214).

A high level at OE allows conduction between the collector and the emitter of transistor 218 (FIG. 8) (an NPN power transistor MJ3055 or similar transistor) grounding a common emitter line for the output transistors (generally designated 220 in FIG. 8) of solenoid drive 54. $RS_0$ will also enable the four-line to sixteen-line decoder/demultiplexer 48 (SN74514 TTL).

Figure 8:
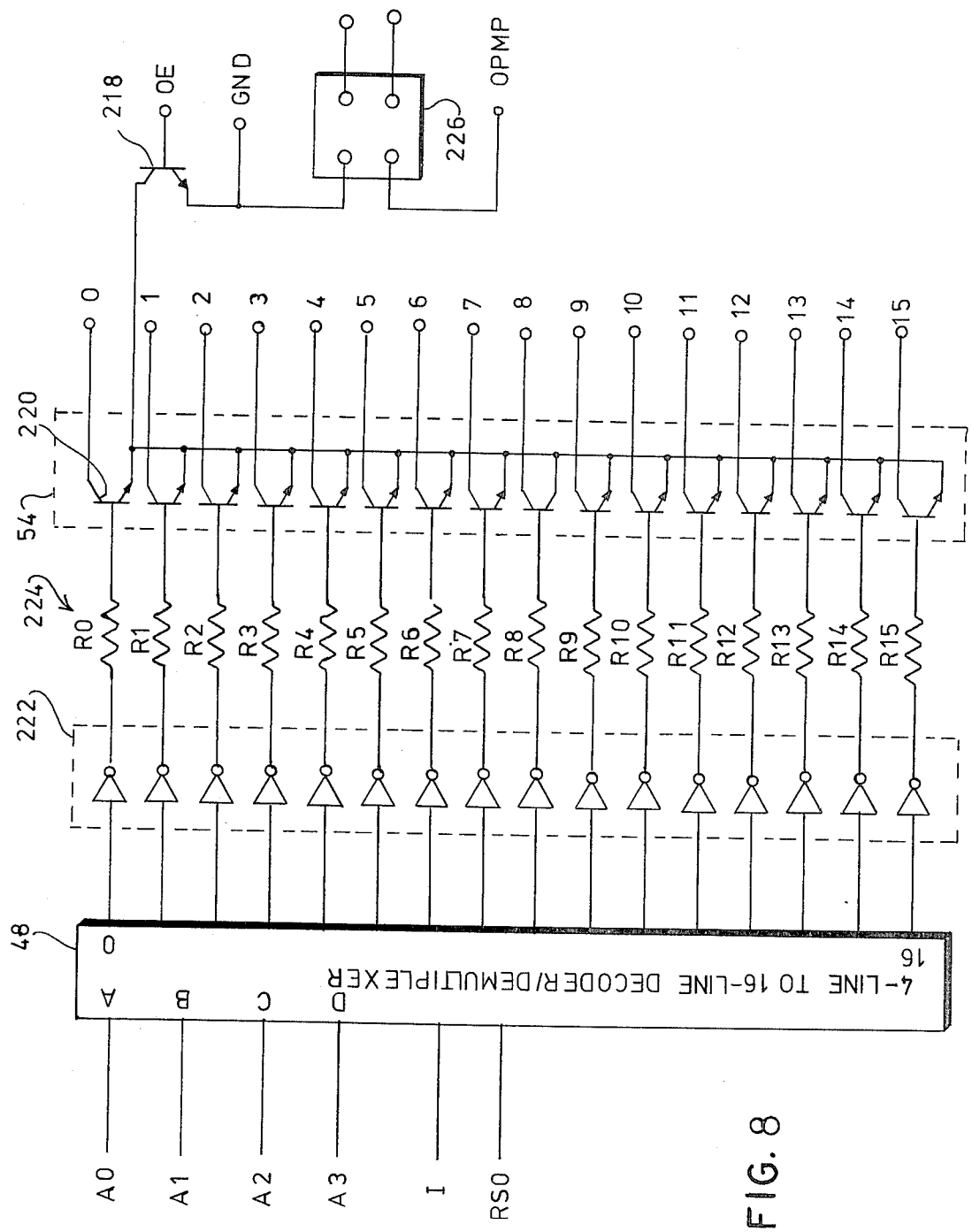
FIG. 8 is a block and schematic diagram of zone selection decoding and solenoid drive circuitry utilized in this invention.

At this time, the zero output of demultiplexer 48 goes low, with the outputs being inverted by buffer amplifiers (generally designated 222 in FIG. 8) turning on the transistor (of transistors 220) corresponding to the zero output of the controller (through an associated resistor RO as shown in FIG. 8 with the resistors being generally designated 224) which starts the watering cycle by an output at 0 to the solenoid valves 52. As also shown in FIG. 8, the high level at the OPMP input will activate the solid state relay 226, which can be used to activate a water pump when needed or desired.

Pulses at $C_{po}$ (FIGS. 4 and 7) needed at the different memory locations (FIG. 4) and corresponding output lines (FIG. 8) are obtained as follows—when the A inputs ($A_1$, $A_2$, $A_3$, and $A_4$) of comparators 94, 95 and 96 (FIG. 4) become equal to the B inputs ($B_1$, $B_2$, $B_3$, and $B_4$), a high level is generated at the X outputs. This will cause the outputs of gate 170 (FIG. 7) to go low if the K output is high, setting flip-flop 230 (which includes NAND gates 231 and 232), which gives a low level at the reset input $R_o(1)$ of counter 234 enabling the counter to count at a speed controlled by $f_k$ (generated in FIG. 3) and coupled to counter 234 through NAND gate 236. Inverter 236 resets flip-flop 230 and stops the pulses coming into the $c_p$ input of the counter by disabling gate 236 so that only one pulse passes through NAND gate 240 and only one pulse appears at $c_{po}$ through diodes 241 and 242, thus increasing the count of counter 98 (FIG. 4) by one therefore switching to the next location in the RAMS 86, 87 and 88 and enabling output 2 on the output circuits (see FIG. 8).

At the same time, the low level of the output of NAND gate 170 (FIG. 7) drives the output of gate 208 high, to drive reset line $RS_1$ high and therefore resetting counters 110–114 (FIG. 5) to the count of zero. Since this level is actually a pulse of very short duration, these counters are immediately enabled to count again until they reach a value equal to the value stored in the second memory location. This process repeats by itself until sixteen pulses reach the $C_p$ input of counter 98 (FIG. 4) to cause the output of inverter 244 (a buffer) connected to counter 100 to go low, putting a low level at MRST (main reset) driving the output of gate 206 (FIG. 7) high to reset the flip-flop formed by gates 205 and 206. Having this flip-flop in the reset state provides a steady high level at $RS_0$ which disables counters 98 and 100 (FIG. 4) and maintains them reset at the count of zero. The $RS_0$ output also provides a low value at input 13 of gate 208 (FIG. 7) to drive the output high and therefore resets counters 110–114 (FIG. 5), which counters remain in this condition until a low level is applied at any of inputs 13, 12, or 10 of gate 205 (FIG. 7). A low level at MRST resets flip-flop 179 to reset counter 186 back to the zero output position.

If day interval switch 197 is positioned at the number 2 position (instead of being at the number 1 position as shown in FIG. 7), then two pulses are needed at the $C_p$ input of counter 186 to set the flip-flops formed by gates 205 and 206. This means that by changing the position of switch 197, a predetermined number of days can be skipped as follows:

| Position | Number of Days Skipped |
| --- | --- |
| 0 | 0 |
| 1 | 1 |
| 2 | 2 |
| 3 | 3 |
| 4 | 4 |
| 5 | 5 |
| 6 | 6 |

By depressing load momentary switch 30 (FIG. 7), counter 245, which has an input K coupled thereto through NAND gate 247 (the second input to which is from output 13 of counter 245 through inverter 248), is enabled which generates a high pulse at output A, which pulse is inverted by inverter 249 and then used to load the memory location specified by counter 98 (FIG. 4).

By depressing the scan momentary switch 250 (shown in FIG. 7 to be grounded at one side and having the other side connected to $V_{cc}$ through resistor 251), flip-flop 252 (which includes NAND gates 253 and 254) is set which, in turn, enables gate 256 and allows $f_s$ (i.e., one pulse per second) to appear at $C_{po}$ and this changes the address for the memory locations at the rate of 1 Hz. This feature is used when the memories are being written, or the information in the location is to be changed.

By depressing start switch 258, a momentary type switch, the complete cycle is initiated independently of the digital clock. Start switch 258 is grounded at one side and the other side is connected to $V_{cc}$ through resistor 259, to the MRST input through diodes 260 and 261, and to pin 13 of gate 205 through diode 262. By depressing stop switch 263, the normal cycle may be interrupted at any time (stop switch 263 is also a momentary type switch, is grounded at one side, and has the other side connected to the $V_{cc}$ through resistor 264).

By depressing the scan momentary switch 250 and then the step switch 265, any zone to be irrigated can be selected and the system will then be turned off automatically at the end of the time interval for that zone in the corresponding memory location (step switch 265 is grounded at one side and has the other side connected to $V_{cc}$ through resistor 266). This is accomplished by the circuit 267 (as shown in FIG. 7b) to include NAND gate 268 connected to step switch 265, NAND gate 270 connected to provide a second input to gate 268, and NAND gates 272 and 274 connected with pin 5 of gate 206 and receiving inputs from inverters 276 and 278, respectively, which inverters are connected to receive the output from gate 170 and the MRST input, respectively, with gate 270 also receiving these inputs through diodes 280 and 282, respectively.

Repeater circuitry 44 is connected to time control circuitry 36 and, more particularly, as shown in FIG. 7, is connected between pins 12 and 13 of NAND gate 205. The repeater circuitry provides the structural elements necessary to repeat the watering cycle several times a day. This is achieved by adding low levels at STRTM, espuced at equal intervals of time.

Figure 9:
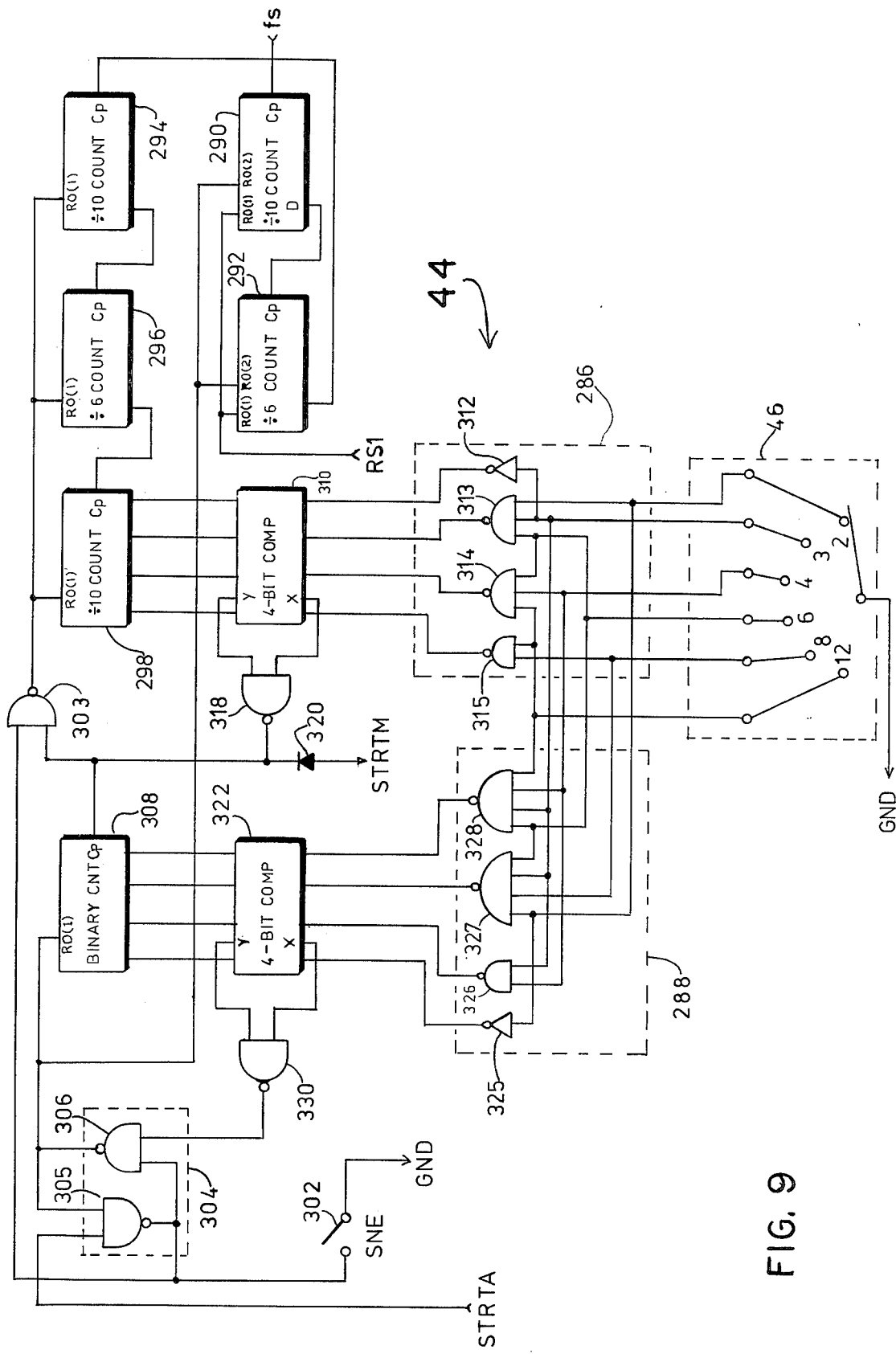
FIG. 9 is a block and schematic diagram of repeater circuitry utilized in this invention.

As shown in FIG. 9, repeater selection switch 46 is utilized to set the number of times that it is desired that the system be started and also the time interval between consecutive starts. The time interval is encoded by gate arrangement 286 as shown below and the corresponding number of starts by the gate arrangement 288 also described below:

| Switch 46 Position | Time Interval Hours | Binary Output of Arrangement 281 | | | | Binary Output of Arrangement 288 | | | | Number of Starts |
|---|---|---|---|---|---|---|---|---|---|---|
| | | DI | CI | BI | AI | DN | CN | BN | AN | |
| 2 | 2 | 0 | 0 | 1 | 0 | 1 | 0 | 1 | 0 | 10 |
| 3 | 3 | 0 | 0 | 1 | 1 | 0 | 1 | 1 | 1 | 7 |
| 4 | 4 | 0 | 1 | 0 | 0 | 0 | 1 | 0 | 1 | 5 |
| 6 | 6 | 0 | 1 | 1 | 0 | 0 | 0 | 1 | 1 | 3 |
| 8 | 8 | 1 | 0 | 0 | 0 | 0 | 0 | 1 | 0 | 2 |
| 12 | 12 | 1 | 1 | 0 | 0 | 0 | 0 | 0 | 1 | 1 |

As shown in FIG. 9, decade counter 290 receives the $f_s$ signal (at 1 Hz) and together with ÷6 counter 292 divides the incoming signal by 60. At the D output of counter 292, a one pulse per minute signal is provided and fed to the $C_p$ input of decade counter 294. Counter 294 together with ÷6 counter 296 divides again by 60 so that at the D output of counter 296, a one pulse per hour signal is achieved. Decade counter 298, connected to the D input of counter 296, keeps track of the hours-interval.

To enable repeater circuitry 44, repeater enable switch (SNE) 302 is opened to enable counters 294, 296 and 298 through NAND gate 303. When a low pulse is received at the STRTA input from time and control circuitry 36 (FIG. 7), flip-flop 304, which includes NAND gates 305 and 306, is set to enable counters 290, 292 and 308 to start counting, which counters remain enabled as long as flip-flop 304 is set. Counter 308 is a binary counter and keeps track of the number of times the system is started.

The outputs from decade counter 298 are coupled to four-bit comparator 310, which comparator also receives a like number of inputs from arrangement 286. As shown in FIG. 9, arrangement 286 includes inverter 312 and NAND gates 313, 314 and 315, all of which are specifically connected to the stationary contacts of SNS switch 46.

When the count kept by counter 298 reaches a value such that inputs A ($A_1$, $A_2$, $A_3$ and $A_4$) and B ($B_1$, $B_2$, $B_3$ and $B_4$) to comparator 310 are equal, a low level signal is generated at the output of NAND gate 318 which receives the X and Y outputs from comparator 310. This low level signal is coupled through diode 320 to input 13 of gate 205 of timing circuitry 36 (FIG. 7). At the same time, the low level signal causes the count kept at binary counter 308 to be incremented by one to cause a high level signal to appear at the output of gate 303 to reset counters 294, 296 and 298 to the count of zero, thus starting a new count. Counters 290 and 292 are also reset to zero if $RS_1$ is at the high level.

The outputs from binary counter 308 are coupled to four bit comparator 322, which comparator also receives the right number of inputs from arrangement 288. As shown in FIG. 9, arrangement 288 includes inverter 325 and NAND gates 326, 327 and 328, all of which are specifically connected to the stationary contacts of SNS switch 46.

When the count at counter 308 reaches a value such that inputs A and B of comparator 322 are equal, a low level signal is generated at the output of NAND gate 330, which receives the X and Y outputs from comparator 322, resetting flip-flop 304, which flip-flop then remains reset until a new low level arrives at the STRTA input. Since flip-flop 304 is reset, all counters have high levels at the reset input and therefore will remain disabled so long as flip-flop 304 remains in the reset condition.

Figure 10:
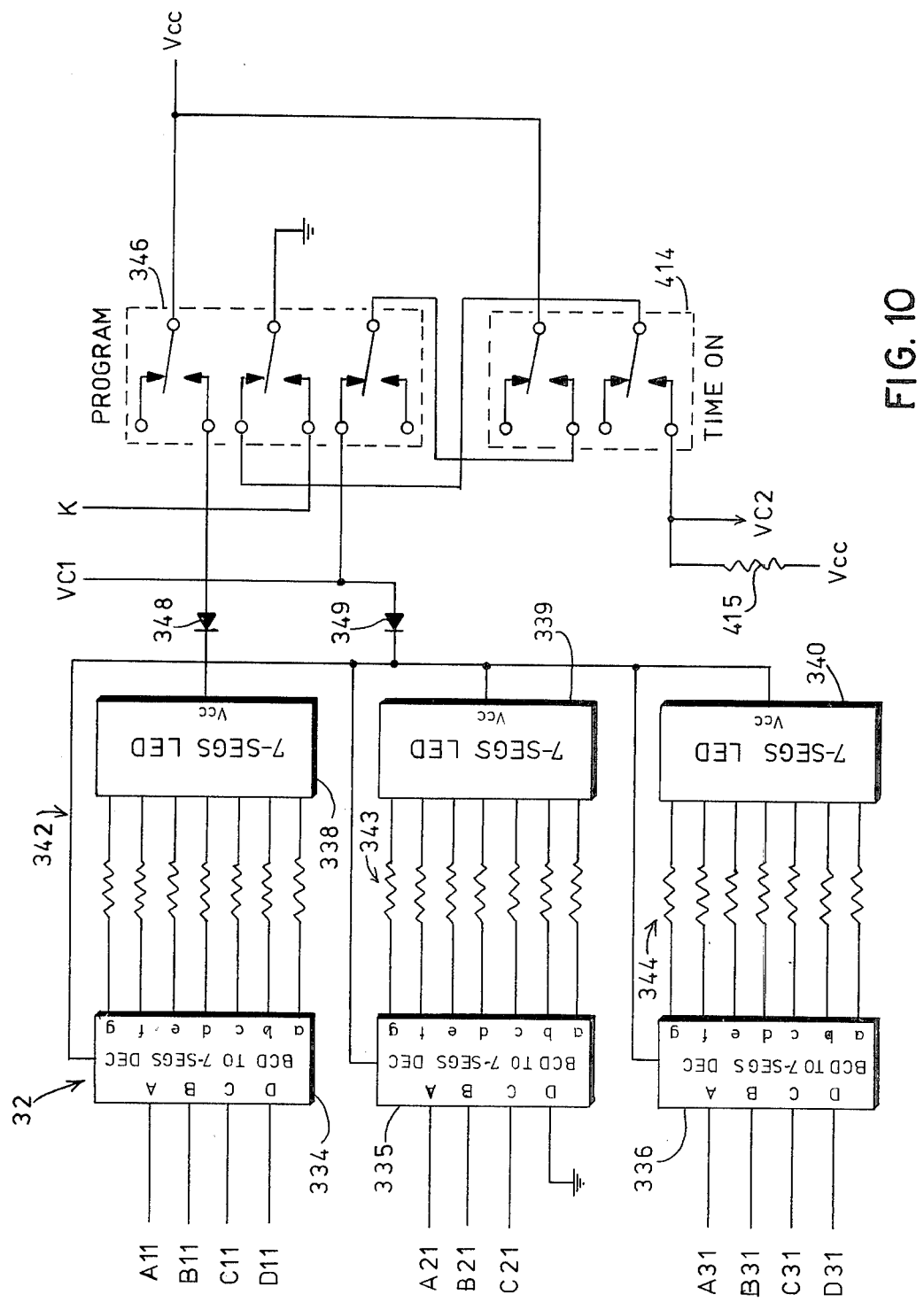
FIGS. 10 and 11 are block and schematic diagrams of display circuitry utilized in this invention.

The inverted output signals from memory circuits 86, 87 and 88 (shown in FIG. 4) are coupled as inputs to BCD-to-seven segments decoders 334, 335 and 336 (as shown in FIG. 10). Standard 7447, BCD-to-seven segments decoder drives are preferably used to feed the inputs of common anode, light emitting diodes, seven segments displays 338, 339 and 340 (LD 110) through, respectively, proper 100 ohm limiting current resistors (designated generally by the numerals 342, 343 and 344, respectively).

Program switch 346 is a three pole, two position switch. As shown in FIG. 10, the switch is in normal position. When this switch is depressed, power is supplied to the display circuits (which normally are not energized) through diodes 348 and 349. At the same time, a low level is applied to K which is coupled to input 1 of gate 351 (FIG. 11) causing a high level at the output of inverter 353 through gate 354 to enable information from counters 356 and 357 to be transferred to the display circuits 359 and 360.

Figure 11:
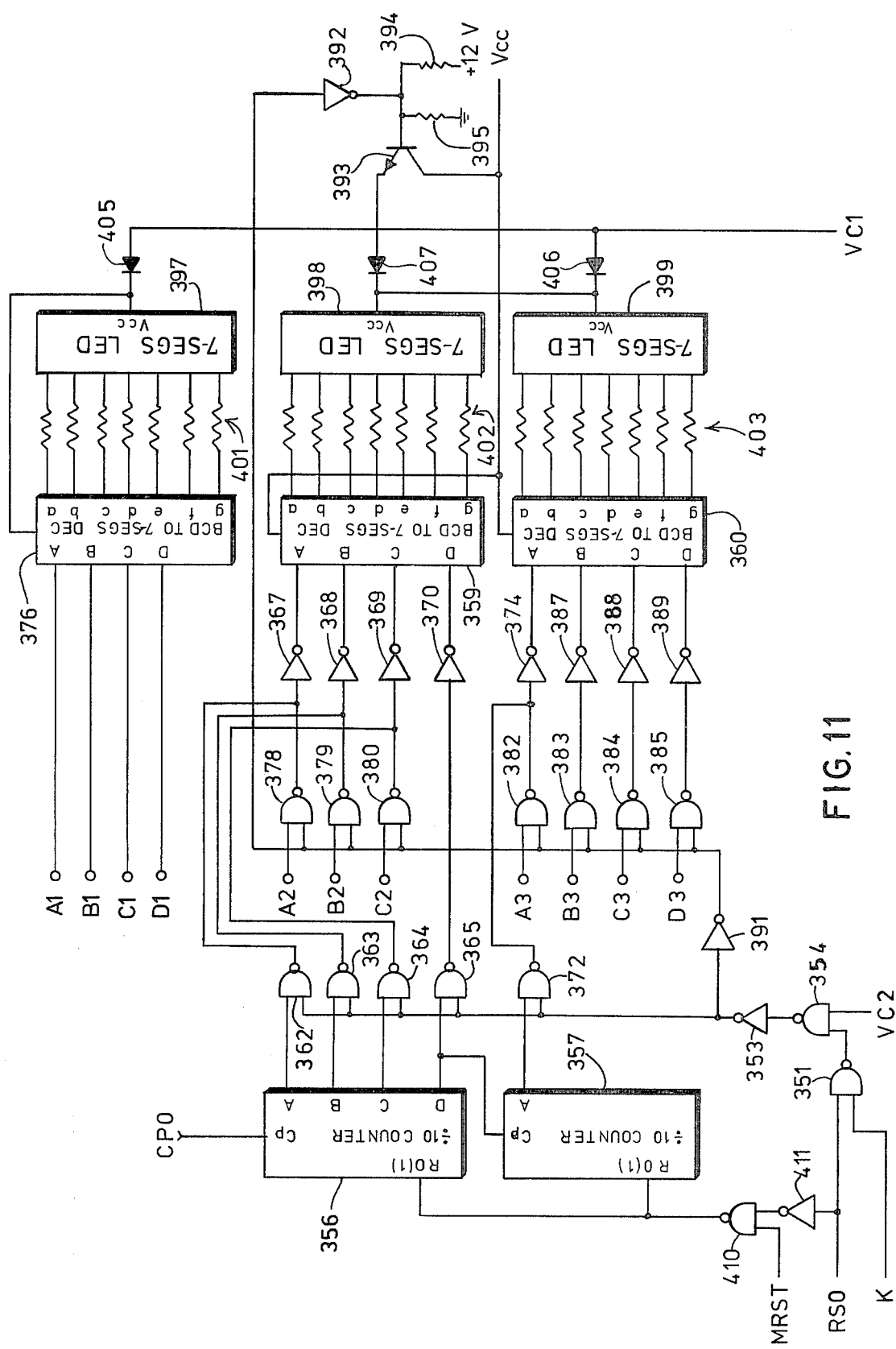

As shown in FIG. 11, the outputs from decade counter 356 are coupled through NAND gates 362, 363, 364 and 365 and inverters 367, 368, 369 and 370 to the inputs to BCD-to-seven segments decoder 359, while the output from decade counter 357 is coupled through NAND gate 372 and inverter 374 and the A input of BCD-to-seven segments decoder 360.

As also shown in FIG. 11, the outputs (A, B, C, and D) from counters 112, 113, and 114 (FIG. 5) are coupled to BCD-to-seven segments decoders 376, 359 and 360, respectively, with the $A_2$, $B_2$, and $C_2$ inputs being coupled through NAND gates 378, 379 and 380, respectively, and inverters 367, 368, 369, respectively, while the $A_3$, $B_3$, $C_3$ and $D_3$ inputs are coupled through NAND gates 382, 383, 384 and 385, respectively, and inverters 374, 387 388 and 389, respectively. A second input is coupled to NAND gates 378–380 and 382–385 and is coupled thereto through inverter 391 connected to the output of inverter 353. This same signal is coupled through inverter 392 to the base of transistor 393, which base is also connected to the junction of resistors 394 (4K) and 395 (6K) forming a voltage divider between the +12 volt power supply and ground.

The outputs from BCD-to-seven segments decoders 376, 359 and 360 are coupled to seven segments displays 397, 398 and 399 through proper 100 ohm resisters (designated generally by the numbers 401, 402 and 403, respectively). Seven segments displays 397 and 399 are also connected to the $V_{cl}$ input through diodes 405 and 406, while the emitter of transistor 393 is connected to seven segments display 398 through diode 407.

Since counters 356 and 357 receive pulses ($C_{po}$) from either gate 240 or gate 256 (FIG. 7), the numbers corresponding to the different memory locations are displayed. Counters 356 and 357 are reset through NAND gate 410, which gate is connected with inverter 411 for the $R_{so}$ input. By depressing scan switch 250 and the program switch 346, the memory location address and the contents of the location itself can both be displayed. A low level at the K input causes a high level at the output of inverter 391 (FIG. 11) to thus avoid display of information from counters 112, 113 and 114 (FIG. 5) during this period.

By depressing time-on switch 414 (FIG. 10), when programming switch 346 is in its normal position (as shown in FIG. 10), $V_{cc}$ power is coupled through the switch to cause the information on counters 112, 113 and 114 (FIG. 5) to be displayed (the junction of resistor 415 and $V_{c2}$ is grounded at this time). This feature is useful when knowledge is to be ascertained as to amount of watering time elapsed in the zone then being watered by the system when the switch is depressed.

Figure 12:
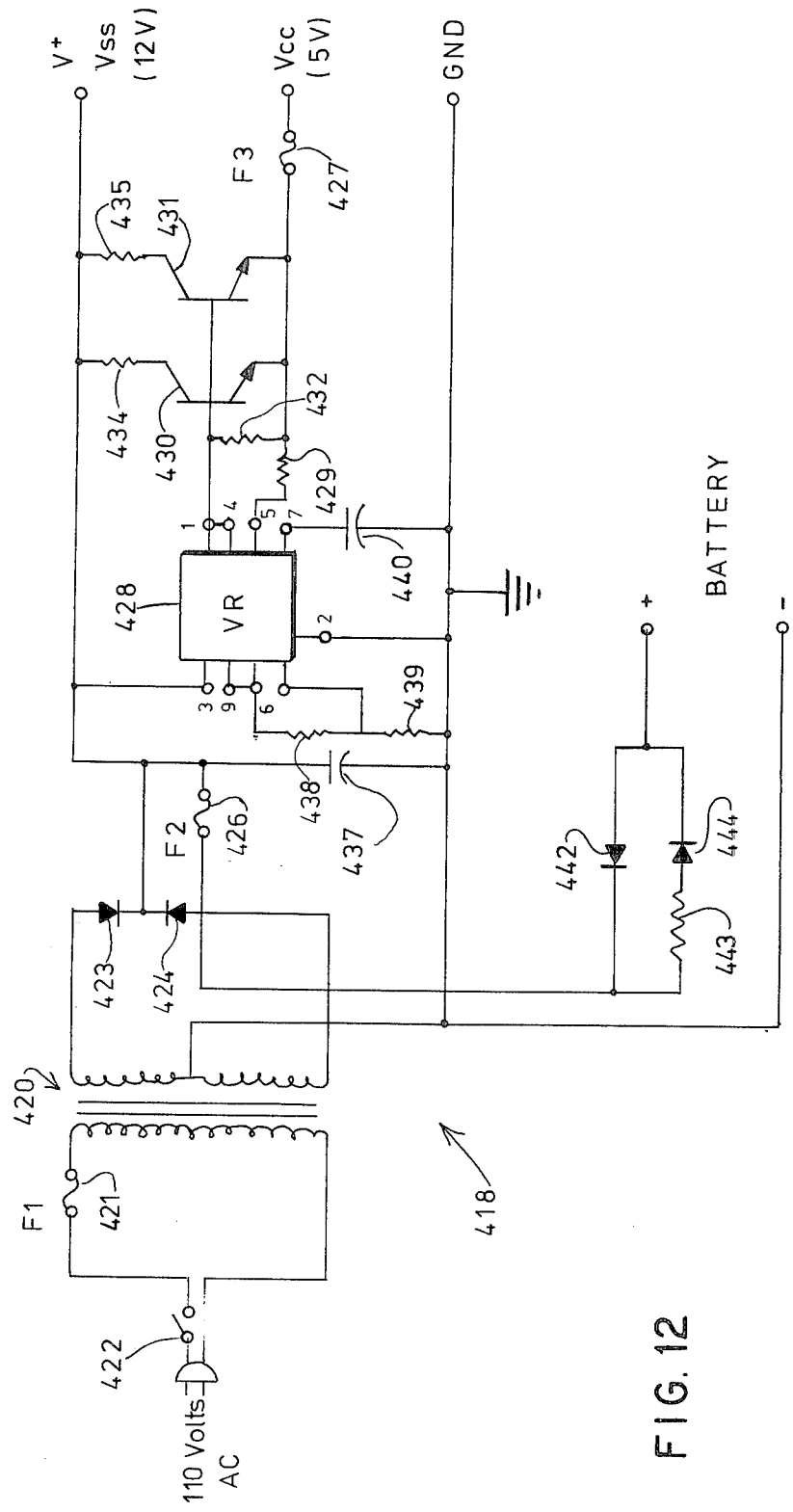
FIG. 12 is a block and schematic diagram of a power supply that may be utilized in the system of this invention.

Power supply 418 (shown in FIG. 12) provides the various voltages needed to drive the CMOS clock ($V_{ss}$ = +12 volts), the TTL logic ($V_{cc}$ = +5 volts), and the solenoid valves that control flow of water to the field stations (V+ = 12 volts).

As shown, the primary winding of transformer 420 is connected to a conventional 110 volt, 60 Hz, AC power supply through fuse 421 and on-off power switch 422. The secondary winding of transformer 420 is grounded at the center and the opposite sides of the secondary winding are connected through rectifiers 423 and 424 to provide a 12 volt DC output through fuse 426. The $V_{cc}$ output of 5 volts is provided through fuse 427 connected to pin 5 of MC 1461 circuit 428 (through resistor 429) and to the emmiter of transistors 430 and 431, the base of each of which transistors is connected to pin 1 of MC 1461 and resistor 432, and the collectors of each of which transistors are connected to the 12 volt power through resistors 434 and 435 (each 1 ohm). In addition, MC 1461 has a bypass capacitor 437 from pin 3 to ground, has pins 6 and 9 connected to ground through resistors 438 and 439, and has a bypass capacitor 440 from pin 7 to ground. Provision is also provided to charge a backup battery if one is desired through diode 442 connected in parallel with resistor 443 and diode 444 to the positive output lead.

Figure 13:
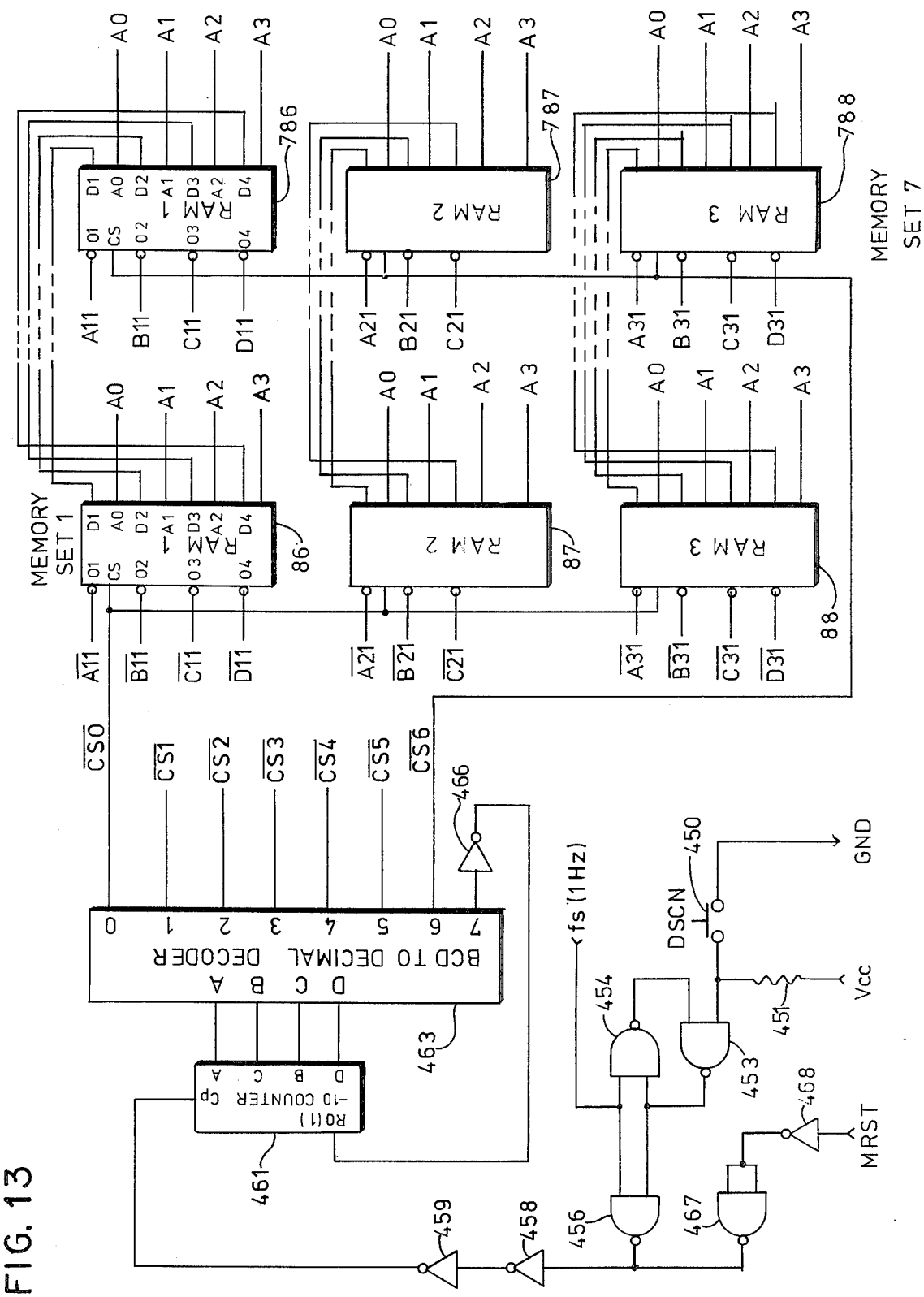
FIG. 13 is a partial schematic block diagram illustrating use of a plurality of memory sets in the system of this invention.

FIG. 13 is an alternate embodiment of the invention to show memory expansion and includes the control circuit to select the memory sets and the additional sets of memories needed to increment the program capabilities. Seven sets of memories can be utilized, for example, to correspond to the seven days of the week. In FIG. 13, only two sets of memories 86–88, 786–788, are shown, but seven sets are indicated (the total number could be varied as needed).

By depressing the DSCN switch 450, each set of memories may be progressively selected at the rate of one pulse per second ($f_s$). This feature is useful to alter the information stored in any memory set.

As shown in FIG. 13, DSCN switch 450 is connected to ground at one side and to the $V_{cc}$ power at the other side through resistor 451. The power side of the switch is also connected to one input of NAND gate 453, the output of which is connected as one input to NAND gates 454 and 456, the second input to each of which gates is the $f_s$ input signal. The output from NAND gate 456 is coupled through inverters 458 and 459 to the $C_p$ input of decade counter 461. The outputs from counter 461 are coupled to BCD-to-decimal decoder 463 which supplied the outputs to the various memory sets utilized, as indicated in FIG. 13. An output is also provided from decoder 463 to reset counter 461 through inverter 466. In addition, an output from NAND gate 467 is coupled to inverter 458 with the input to gate 467 being through inverter 468. In normal operation, the memory sets are progressively selected on a round robin basis by the main reset pulse (MRST) at the end of each watering cycle through inverter 468 and gate 467.

For operation, the operator first depresses the power switch 422 to apply power to the unit (the real time clock display will show 12:00). Next, the operator depresses the programming (PROG) switch 346. This enables the time set and station number displays. Using the numbered individual switches 20 (0–9), the time desired is then selected. The LOAD switch is then depressed to lock the time interval for station "00". The TIME SET display will show the time that has just been selected (or keyed-in).

The scan switch is then depressed to cause the controller to move to station "01". The above-described steps are then repeated to select a time interval for station "01". This same procedure is then repeated to select timing for each station utilized to thus program a watering interval for each.

Once programming has been completed, the PROG switch is again momentarily depressed for turn off. This will avoid accidental program alteration. By closing the SCAN switch (and maintaining it in closed position), the controller will move through all stations successively at the rate of one per second. This allows the selection of one station quickly when the program of only one station must be modified.

The STEP switch, when momentarily depressed, allows only one station to water, this being the one indicated by the STATION number display. Using the STEP and SCAN switches together, any station can be selected, and will allow watering for its programmed time interval.

To set the real time clock, switches H, T, M and A are used. By depressing H, hourse are set; by depressing T, tens of minutes are set; and by depressing M, minutes are set. To set the automatic starting time for the irrigation cycle switch, switch A must be depressed and kept depressed while the starting time is set using switches H, T and M.

By using the DAY INTERVAL switch any number of days from one to six can be skipped, and by using the TIMES PER DAY switch, the desired cycle repetition in a period of 24 hours can be obtained.

As can be appreciated from the foregoing, this invention provides an improved control system that is particularly well suited for controlling the duration and frequency of the watering of a lawn or the like.

What is claimed is:

1. A system for automatically controlling at least one timed operation of a controlled device, said system comprising:
   at least one memory unit capable of storing timing information and providing an output indicative thereof, said memory unit including a plurality of interconnected memory circuits for providing timing information with respect to both minutes and hours;
   programming means connected with said memory unit for causing predetermined timing information to be stored in said memory unit indicative of timing required for operation of a device controlled by said system;
   signal generating means for generating time related signals;
   comparator means for receiving said time related signals from said signal generating means and said output indicative of timing information from said memory unit and responsive thereto producing a timewise indicative output; and
   control enabling means connected with said comparator means to receive said timewise indicative output therefrom and responsive thereto producing an ouput suitable for timewise controlling the operation of a said controlled device.

2. The system of claim 1 wherein the said control device is an actuator for a watering system, and wherein said system is connected to said actuator to control the time said watering system is in operation.

3. The system of claim 1 wherein each of said memory circuits is a random access memory.

4. The system of claim 1 wherein said system includes a keyboard, and wherein said programming means includes time selection switches located at said keyboard to facilitate programming of said memory unit.

5. The system of claim 4 wherein said programming means also includes encoding means positioned between said selection switches and said memory unit.

6. The system of claim 4 wherein said system includes display means located at said keyboard to display timing information thereat.

7. A system for for automatically controlling at least one timed operation of a controlled device, said system comprising:
   at least one memory unit capable of storing timing information and providing an output indicative thereof;
   programming means connected with said memory unit for causing predetermined timing information to be stored in said memory unit indicative of timing required for operation of a device controlled by said system;
   signal generating means for generating time related signals, said signal generating means including a digital clock and time generating circuitry controlled by said digital clock;
   comparator means for receiving said time related signals from said time generating circuitry of said generating means and responsive thereto producing a timewise indicative output; and
   control enabling means connected with said comparator means to receive said timewise indicative output therefrom and responsive thereto producing an output suitable for timewise controlling the operation of a said controlled device.

8. A system for automatically controlling at least one timed operation of a controlled device, said system comprising:
   at least one memory unit capable of storing timing information and providing an output indicative thereof;
   programming means connected with said memory unit for causing predetermined timing information to be stored in said memory unit indicative of timing required for operation of a device controlled by said system;
   signal generating means for generating time related signals;
   comparator means for receiving said time related signals from said signal generating means and said output indicative of timing information from said memory unit and responsive thereto producing a timewise indicative output; and
   control enabling means connected with said comparator means to receive said timewise indicative output therefrom and responsive thereto producing an output suitable for timewise controlling the operation of a said controlled device, said control enabling means including time control means and decoding means for generating said output suitable for timewise controlling the operation of said controlled device.

9. The system of claim 8 wherein said system includes repeater circuitry connected with said time control means to cause repeating of said timewise control of the operation of a controlled device.

10. A system for automatically controlling the timed operation of a watering installation, said system comprising:
    a set of interconnected memory circuits capable of storing timing information and providing outputs indicative thereof;
    a programmer including time selection switches and an encoder connected between said time selection switches and said memory circuits for causing predetermined timing information to be stored in said memory circuits indicative of timing required for automatic operation of a watering installation controlled by said system;
    signal generating means including a digital clock and time generating circuitry connected with said digital clock and providing time related output signals controlled by said digital clock;
    a set of comparators each of which receives said related output signals from said signal generating means and different ones of said outputs indicative of timing information from said memory circuits with each of said comparators producing a timewise indicative output; and
    control enabling means connected with said set of comparators to receive the timewise indicative outputs therefrom and responsive thereto producing an output signal to timewise control the operation of a said watering installation connected to said system.

11. The system of claim 10 wherein said set of interconnected memory circuits includes three random access memories for storing operation in hours and minutes.

12. The system of claim 10 wherein said system includes a keyboard, wherein said time selection switches are located on said keyboard, and wherein said system also includes an LED display located on said keyboard, said display being connected with at least said memory circuits.

13. The system of claim 12 wherein said display is also connected with said signal generating means for display purposes.

14. The system of claim 10 wherein said decoder provides means including a binary coded decimal output and wherein said programmer also includes a set of latches connected with said encoder to receive said binary coded decimal output therefrom, each of said latches being connected with a different one of said set of memory circuits.

15. The system of claim 14 wherein said encoder includes four gates each of which provides a different output of said binary coded output decimal, wherein each of said latches of said set of latches is a four bit latch, and wherein each of said comparators of said set of comparators is a four bit comparator.

16. The system of claim 10 wherein said signal generating means includes frequency division means and a set of decade counters connected with said frequency division means with each of said decade counters supplying a different input to each of said set of comparators.

17. The system of claim 10 wherein said control enabling means includes logic means havng gate means for receiving said outputs from said comparators, said control enabling means also including zone selection decoding means connected with said logic means.

18. The system of claim 17 wherein said watering installation is controlled by solenoids, and wherein said control enabling means includes solenoid drive means connected with said zone selection decoding means and said solenoids to control said watering operation.

19. The system of claim 18 wherein said control enabling means includes means for enabling different solenoids for different time periods.

20. The system of claim 18 wherein said control enabling means includes repeat means for causing repeating of each watering operation.

21. The system of claim 18 wherein said control enabling means includes day interval switching means for determining periodic watering operations relative to a period of days.

22. The system of claim 10 wherein said system includes a plurality of sets of memory circuits and means for selectively actuating the same, whereby different programs can be selected for different days.

23. A system for automatically controlling the timed operation of a watering unit having a plurality of stations, said system comprising:
a keyboard having a plurality of time selection switches and at least one visual display thereat;
an encoder connected with said time selection switches for providing a coded output signal indicative of selected timing for control of operation of a connected watering unit; and
signal processing means connected with said encoder to receive said encoded output signal therefrom and connected with said visual display to display watering information thereat, said signal processing means including determining means for determining said selected timing from said received coded output signal and enabling means connected with said determining means for enabling individual operation of each of said plurality of stations of said watering unit whereby each station can be operated for different periods of time and at different intervals.

24. The system of claim 23 wherein said signal processing means includes memory circuit means for storing said selected information in said coded output signal from said encoder.

25. The system of claim 23 wherein said determining means of said signal processing means includes comparator means.

26. The system of claim 23 wherein said enabling means includes logic circuitry.

27. The system of claim 23 wherein said system includes means for enabling operation of each of said stations for different periods of time and at different intervals over an extended period of time.

* * * * *